United States Patent
Zimmermann et al.

(10) Patent No.: US 9,637,174 B2
(45) Date of Patent: *May 2, 2017

(54) METHOD FOR PRODUCING HOT-FORMED AND PRESS-HARDENED AUTOMOBILE COLUMN

(71) Applicant: Benteler Automobiltechnik GmbH, Paderborn (DE)

(72) Inventors: Andreas Zimmermann, Bielefeld (DE); Jan Dingemans, Paderborn (DE); Markus Pellmann, Sassenberg (DE); Johannes Böke, Blomberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 503 days.

This patent is subject to a terminal disclaimer.

(21) Appl. No.: 14/031,772

(22) Filed: Sep. 19, 2013

(65) Prior Publication Data

US 2014/0166166 A1 Jun. 19, 2014

Related U.S. Application Data

(63) Continuation of application No. 13/273,760, filed on Oct. 14, 2011, now abandoned.

(30) Foreign Application Priority Data

Oct. 15, 2010 (DE) .................. 10 2010 048 209
Feb. 23, 2011 (EP) .................... 11155681

(51) Int. Cl.
 C21D 1/20 (2006.01)
 C21D 1/673 (2006.01)
(Continued)

(52) U.S. Cl.
 CPC ............. *B62D 25/04* (2013.01); *B62D 25/08* (2013.01); *C21D 1/20* (2013.01); *C21D 1/673* (2013.01);
(Continued)

(58) Field of Classification Search
None
See application file for complete search history.

(56) References Cited

U.S. PATENT DOCUMENTS 9,340,233 B2 * 5/2016 Pellmann ............... B62D 25/08
2002/0104591 A1 8/2002 Gehringhoff et al.
(Continued)

FOREIGN PATENT DOCUMENTS

CN 101189350 A 5/2008
CN 101861265 A 10/2010
(Continued)

OTHER PUBLICATIONS

Akbarpour, Effect of ferrite volume fraction on work hardening behavior of high bainite dual phase (DP) steel, Material Science & Engineering, 2008, vol. 477, pp. 306-310.*
(Continued)

*Primary Examiner* — Deborah Yee
(74) *Attorney, Agent, or Firm* — Henry M. Feiereisen LLC (57) ABSTRACT

A method for producing an automobile column is disclosed. The automobile column has a region of a first type and a region of a second type which have mutually different strengths. A transition region having a width of less than 50 mm is formed between the two regions. The automobile column has in the region of the first type a bainitic structure and in the region of the second type a martensitic structure.

28 Claims, 3 Drawing Sheets

(51) Int. Cl.
C21D 8/00 (2006.01)
C21D 9/00 (2006.01)
B62D 25/04 (2006.01)
B62D 25/08 (2006.01)
B62D 25/00 (2006.01)
C21D 8/02 (2006.01)
C21D 8/04 (2006.01)
C22C 1/02 (2006.01)
C22C 38/02 (2006.01)
C22C 38/04 (2006.01)
C22C 38/06 (2006.01)
C22C 38/14 (2006.01)
C22C 38/32 (2006.01)

(52) U.S. Cl.
CPC ........... *C21D 8/005* (2013.01); *C21D 8/0205* (2013.01); *C21D 8/04* (2013.01); *C22C 1/02* (2013.01); *C22C 38/02* (2013.01); *C22C 38/04* (2013.01); *C22C 38/06* (2013.01); *C22C 38/14* (2013.01); *C22C 38/32* (2013.01); *C21D 2211/002* (2013.01); *C21D 2211/008* (2013.01); *C21D 2221/00* (2013.01)

(56) References Cited

U.S. PATENT DOCUMENTS

| | | | |
|---|---|---|---|
| 2004/0060623 A1* | 4/2004 | Boke | C21D 1/19 148/641 |
| 2007/0107819 A1 | 5/2007 | Gehringhoff et al. | |
| 2008/0196800 A1* | 8/2008 | Beenken | B21D 22/022 148/643 |
| 2010/0300584 A1 | 12/2010 | Buschsieweke et al. | |
| 2010/0308623 A1* | 12/2010 | Bodin | B62D 29/00 296/193.06 |
| 2011/0132502 A1 | 6/2011 | Bian | |

FOREIGN PATENT DOCUMENTS

| | | |
|---|---|---|
| DE | 102 08 216 | 3/2003 |
| DE | 102005054847 | 10/2007 |
| DE | 10 2007 057855 B3 | 10/2008 |
| DE | 102008022399 | 11/2009 |
| WO | WO 2010/076247 A1 | 7/2010 |

OTHER PUBLICATIONS

Thomas Tröster et al. : Innovative Warmumformung "(innovative hot-forming), international conference Neuere Entwicklungen in der Umformtechnik", Fellbach, Germany, May 11-12, 2004, p. 51-66, XP009130353, ISBN: 978-3-88355-331-3.

Thomas Ausmann: "Hot Stamp Technologies", Sep. 15, 2010, XP002668592, http://us.aptgroup.com/19946/40358/BentelerAutomotive.pdf.

Hein Philipp et al: "Status and innovation trends in hot stamping of USIBOR1500P", Steel Research International, Verlag Stahleisen GmbH, Duesseldorf, Germany, vol. 79 No. 2, Feb. 1, 2008, p. 85-91, XP009101799, ISBN:1611-3683.

* cited by examiner

METHOD FOR PRODUCING HOT-FORMED AND PRESS-HARDENED AUTOMOBILE COLUMN

CROSS-REFERENCES TO RELATED APPLICATIONS

This application claims the priority of German Patent Application, Serial No. 10 2010 048 209.9, filed Oct. 15, 2010, and of European Patent Application Serial No. 11 155 681.7, filed Feb. 23, 2011 pursuant to 35 U.S.C. 119(a)-(d), the content of which is incorporated herein by reference in its entirety as if fully set forth herein.

This application is a continuation of prior filed now abandoned U.S. application Ser. No. 13/273,760, filed Oct. 14, 2011.

BACKGROUND OF THE INVENTION

The present invention relates to a method for producing an automobile column by hot-forming and press hardening.

The following discussion of related art is provided to assist the reader in understanding the advantages of the invention, and is not to be construed as an admission that this related art is prior art to this invention.

The requirements profile for vehicle safety increases in the automotive industry due to regulatory and manufacturer-specific guidelines. At the same time, the automobile manufacturers strive to reduce the weight of the automobile bodies in order to minimize fuel consumption and $CO_2$ emission. This creates a divergence between low weight and high bending and torsion strength and high crash safety.

According to one approach, for example light-metal materials, in particular aluminum alloys, or bodies in hybrid construction, for example made of metallic alloys and fiber composite material or plastics, can be used. However, the aforementioned approaches are both associated with high material costs, which in turn increases the vehicle production costs of models produced in large quantities.

However, a metallic alloy, in particular steel, still remains the preferred material for constructing the body, in particular the raw body. Due to consequent improvements, steel is still viewed as a high-tech material which due to different processing approaches represents a good compromise between favorable manufacturability, excellent crash safety and long service life.

Heat-treatment is according to the state-of-the-art typically performed in a temperature range between 320° C. and 400° C. and hardly changes the material properties and the strength values adjusted in the hot-forming and trans-hardening process. At the same time, however, the ductility of the material is increased so as to allow superior fold formation in a crash.

However, the additional heat-posttreatment once more increases the production costs due to significantly higher tooling costs up to the start of the series production.

It would therefore be desirable and advantageous to obviate prior art shortcomings and to provide an improved automobile component and a method for its manufacture, which has lower manufacturing costs compared to the state-of-the-art, while simultaneously allowing precise adjustment of material properties inside the component.

SUMMARY OF THE INVENTION

According to one aspect of the present invention, an automobile column with at least two regions of different strength is produced by hot-forming and press-hardening, wherein a region of a first type has after press-hardening a substantially bainitic structure and a region of a second type has after press-hardening a substantially martensitic structure, and a transition region between the region of the first type and the region of second type being smaller than 80 mm.

According to one advantageous feature of the present invention, the transition region may be smaller than 50 mm, preferably smaller than 30 mm and more preferably smaller than 20 mm. Because the transition region is very small, the component can within the context of the invention specifically adjusted in a single production step, namely the production method itself, so that the required crash properties can be reliably implemented with the current manufacturing tolerances, while simultaneously having improved manufacturability.

An automobile column can, for example, be formed as an A-column, a B-column, a C-column, or a D-column. A softer structure with high elongation at break or ductility may be required for attachment in the region of the attachment points to a roof beam or a rocker panel, thus preventing crack-off in a crash while simultaneously adjusting a targeted fold structure.

However, within the context of the invention, specific regions with a higher ductility may be required in the region of door hinges and other attachment points to prevent cracking in a crash. For example, also when additional components or reinforcement patches are joined with rivets, regions with high ductility can be specified for the automobile column according to the invention with high accuracy during production, so that rivets or other attachment points are prevented to the greatest possible extent from detaching in these regions in a crash.

Weakening of the material caused by vibrations under high permanent load and/or vibrations in conjunction with a high stiffness is also prevented. The remaining components of the automobile column, i.e. the regions of the second type, have a substantially martensitic structure with particularly high strength values, so that the minimally required strength of the component is adequately attained.

The automobile column produced according to the invention can thus be produced more cost-effectively compared to components produced with conventional production methods, because only a single reforming and press-hardening process is required for adjusting the most important required properties of the components. The adjustment by way of a substantially martensitic structure and an intermediate structure which is substantially defined by a bainitic structure, allows a particularly error-free, specific adjustment of the required material properties in clearly defined regions of the component.

According to one advantageous feature of the present invention, in the region of the second type having a martensitic structure as the major component of the structure, the martensitic fraction of the structure may be higher than 50%, in particular higher than 80%, preferably higher than 90% and even more preferred higher than 95%.

The high torsional stiffness and bending stiffness of the martensitic structure guarantees the elevated hardness of the automobile column according to the invention, which preserves the integrity of the passenger compartment as much as possible in the event of a flip-over or other crash effects and also protects the vehicle occupants as best as possible.

According to another advantageous feature of the present invention, bainite may be present as an additional structure component in the region of the second type.

According to one advantageous feature of the present invention, the region of the first type may have as the primary structure component bainite, wherein additional structure components may be present in concentrations of less than 50%, preferably less than 30%, and in particular less than 15%. For example, a mixed structure of bainite, with ferrite and/or perlite may be present. Optionally, within the context of the invention, martensite may also be present as a component of the structure in the region of the first type.

For applications, for example, in a B-column of an automobile, the attachment region is arranged in the foot or roof region, meaning to the rocker panel or roof beam, adjacent to the region of second type with a substantially parallel transition boundary.

According to one advantageous feature of the present invention, the region of the first type may be at least partially enclosed by the region of the second type; preferably, the region of the first type is completely enclosed by the region of the second type. For example, the region of the first type may be completely enclosed by the region of the second type in the region of the attachment points for automobile doors. Due to the particularly small transition region according to the invention, the stiffness in the direction of the component remains unchanged, so that essentially no weakened location is produced, for example in form of an undesired rated breakpoint. The region of the first type is also in ductile form, preventing cracking as much as possible. The ductility of the region of the first type also largely prevents door hinges or door locks from being torn off, for example in a side crash.

According to one advantageous feature of the present invention, the region of the first type may be spot-shaped, for example with a diameter of less than 40 mm, in particular of less than 20 mm and particularly preferred of less than 10 mm.

According to one advantageous feature of the present invention, a passage may be produced in the region of the first type. This means the passage may be formed simultaneously during the reforming process and/or press-hardening process; in a particularly preferred embodiment, the passage can also be created after the end of the press-hardening process. Due to the higher ductility, tool wear of a punching or stamping tool is reduced, or the passage can only be produced by this process without crack formation.

According to one advantageous feature of the present invention, marginal regions, in particular recesses and flanges, may be formed as regions of the first type, wherein cracks originating from the edge can be effectively prevented. Also regions subjected to mechanical processing after press-hardening, such as re-orientations, can advantageously be implemented as regions of the first type.

According to one advantageous feature of the present invention, the region of the first type can also be provided as a region for producing cutting edges. This provides an initial material characteristic which is gentle on the cutting or separation tool to advantageously allow cold cutting after hot-forming and press hardening, for example with simple cutting and/or separation methods. Further machining of the component, for example by cutting, is here particularly gentle, precise and cost-effective while maintaining the required tight tolerances. In particular, the need for an expensive laser cutting of the otherwise hard edge of the component can be eliminated. To this end, a circumferential, narrow region of the second type can advantageously be formed proximate to the edge contour. The risk of a delayed formation of cracks, caused by local stress in the hard structure, is at the same time significantly reduced.

According to one advantageous feature of the present invention, the region of the first type may have a stretchability A50 between 10 and 30%, preferably between 14 and 20%. This ensures sufficiently high strength, with simultaneously adequate ductility, thereby preventing the formation of cracks and hence individual structural automobile components to be torn off in a crash.

According to one advantageous feature of the present invention, the region of the first type may have a tensile strength between 500 and 1000 N/mm$^2$, preferably between 550 and 800 N/mm$^2$. The region of the first type may have an elongation limit between 200 and 800 N/mm$^2$, preferably between 250 and 600 N/mm$^2$, particularly preferred between 250 and 500 N/mm$^2$, and especially preferred between 300 and 500 N/mm$^2$.

According to one advantageous feature of the present invention, between the region of the second type and the region of the first type, the elongation limit and/or the tensile strength may be formed with a decreasing or increasing gradient of more than 100 N/mm$^2$, preferably more than 200 N/mm$^2$, and in particular more than 400 N/mm$^2$ per 10 mm. This means that the elongation limit and/or the tensile strength in the region of the first type may increase by more than 100 N/mm$^2$ per 10 mm in the direction of the region of the second type.

According to one advantageous feature of the present invention, the region of the second type may have a strength of more than 1000 N/mm$^2$, in particular more than 1200 N/mm$^2$, and particular preferred more than 1400 N/mm$^2$.

According to another aspect of the present invention, a method according to the invention for producing a hot-formed and press-hardened automobile column, wherein the automobile column has at least two regions of different strength, includes the following method steps:

providing a hardenable metal plate or semi-finished product and heating the hardenable metal plate or semi-finished product to at least an austenizing temperature, intermediately cooling a region of a first type of the metal plate or semi-finished product with a cooldown speed selected to be greater than a lower critical cooldown speed of a material of the metal plate or semi-finished product, and hot-forming and press-hardening the metal plate or semi-finished product in a press-hardening tool to form the automobile column.

According to one advantageous feature of the present invention, an intermediate stage structure may be adjusted under time control and/or temperature control. The intermediate stage structure may be adjusted, in particular, in the region of the first type of the metal plate by intermediate cooling. The cooldown speed of the intermediate cooling may be selected within the context of the invention so as to be above the lower critical cooldown speed of the bainite formation of the material of the metal plate. The cooldown speed may also be greater than the lower critical cooldown speed of the bainite formation. In particular, those regions are cooled which are designed to be soft after press-hardening, i.e., they have a higher ductility.

According to one advantageous feature of the present invention, the component may also be preformed to a semi-finished product while cold. The component is then at least partially preformed from a hardenable metal plate. Preferably, the preforming step matches at least 80% of the final shape of the component. Following the cold preforming process, which can be carried out, for example, at room temperature, a heating step to at least the austenizing temperature, i.e. to above the AC3 temperature, may be performed. Thereafter, a region of the first type is at least partially intermediately cooled, followed by additional steps of the method according to the invention.

The cooldown process of the intermediate cooling is performed after the hardenable metal plate is heated to the austenizing temperature, but may also be performed within the context of the invention before or during the hot-forming and press-hardening process. In particular, if the cooldown process of the intermediate cooling is performed during press-hardening, suitable means are provided in the pressing tool capable of performing a corresponding cooldown as well as corresponding cooldown speeds.

If the intermediate cooling takes place before hot-forming and press-hardening, then this is associated with a production line with corresponding intermediate transfers of the metal plate that was heated above the austenizing temperature.

The cooldown itself may be performed, for example, by free or forced convection, with cooling rollers, two-sided or one-sided annealing plates with an insulated abutment or by applying cooling media, such as water, or with other suitable cooling devices. The cooldown can hereby be performed in a fixedly installed intermediate station as well as in a cooling unit which moves commensurate with the production cycle. Preferably, a cooldown speed for the intermediate cooling is between 200 Kelvin per second and 5 Kelvin per second. Particularly preferred is a cooldown speed of 50 Kelvin per second. The cooldown is hereby preferably performed immediately after removal from the furnace. In this way, strength values in the first regions between 550 and 900 MPa are adjusted. Preferably, strength values of substantially 700 MPa are adjusted.

According to one advantageous feature of the present invention, a region of the second type is held above the austenizing temperature, wherein the region of the second type may be any region of the metal plate that is not occupied by the region of the first type. This means that after the metal plate is heated to at least in the austenizing temperature, a corresponding temperature above the austenizing temperature is maintained. This may be done actively by using external heat sources, or passively by employing suitable insulation. A temperature above the temperature AC1 may also be maintained. Although a certain loss in strength may occur compared to forming from AC3, this is noncritical in most situations.

When employing external heat sources, the temperature may be held in the region of the second type, in particular with infrared lamps, heating coils, pore burners, insulation plates or similar external heat sources. Within the context of the invention, a temperature significantly above the austenizing temperature may be selected, wherein the time after the heat-up to above the austenizing temperature has ended to the start of the press-hardening process and the accompanying cooldown are matched to one another such that the region of the second type is at the start of the press-hardening process still at a temperature which is at least above the austenizing temperature.

According to one advantageous feature of the present invention, the cooldown speed during intermediate cooling of the region of the first type may be selected so that a bainitic structure is obtained; preferably, the material is cooled down to a temperature between 700 and 400° C., preferably 650 to 450° C., and in particular to 650 to 500° C. With cooldown speeds that are greater than the lower critical cooldown speed of the respective employed material, but which stop above the martensitic start temperature, the so-called bainite formation occurs during isothermal holding of the cooldown temperature, also known as intermediate structure or as intermediate stage.

Unlike with conventional methods, where perlite or ferrite is formed, with perlite being formed mainly directly from the austenite by diffusion, the diffusion of carbon in the austenite is significantly hindered in the intermediate stage of the bainite as a result of the more rapid cooldown. Small austenite regions, mostly originating at grain boundaries, are transformed during bainite formation into a distorted alpha lattice. Because the diffusion velocity in the alpha lattice is significantly greater than in the gamma lattice, small cementite grains precipitate in these alpha mixed crystals which are oversaturated with carbon, which become finer with faster cooldown. This produces a substantially needle-like bainitic structure. This also produces a grainy structure of the carbides caused by the increasing hardness which increases with the grain fineness. A further difference is made in the bainite structure between an upper intermediate stage, in which the carbides are combined for increased incursion, and a lower intermediate stage, in which the carbides are very finely distributed.

According to one advantageous feature of the present invention, the region of the first type may be maintained at the cooldown temperature of the intermediate cooling for a predetermined time; preferably, the temperature is held substantially isothermal. With this approach, the respective required or desired strength values of the bainitic intermediate structure can be adjusted exactly as a function of time. The intermediate cooling in this embodiment takes place substantially to a temperature where the material structure in the region of the first type has been transformed into austenite, or occurs directly into the intermediate structure. From this cooling temperature, the material structure is further transformed by isothermal holding for a specified time. The material is then transformed from an austenitic structure to a bainitic structure. If the material is cooled directly into the intermediate stage by selecting the cooldown speed, then a mixed structure between austenite and bainite are already adjusted. By holding at the cooldown temperature, holding is performed for a predetermined time in a purely bainitic structural transformation range. The longer the region of the first type is held at the temperature, the greater becomes the bainitic component of the structure.

According to one advantageous feature of the present invention, the intermediate structure range cooled to the cooldown temperature is further quenched from the bainitic structural transformation stage in the press-hardening tool itself, so that a mixed structure of martensite and bainite is adjusted in the region of the first type. By quenching the region of the first type, where the structure has an intermediate stage, the residual austenite fractions are transformed to martensite fractions during press-hardening. As a result, a martensite-bainite mixed structure is produced in the regions of the first type. The fractions of the bainite in relation to martensite depend again from the duration during which the first region is held in the intermediate stage, before the press-hardening process begins.

According to one advantageous feature of the present invention, the region of the first type may be held isothermally during a certain time interval so as to transform the region of the first type is completely into bainite. This produces a material structure with a higher strength compared to a ferritic-perlitic structure. In particular, a perlitic structure is hereby intentionally avoided, which would reduce the ductility.

According to one advantageous feature of the present invention, the cooldown speed during intermediate cooling may be selected to be above a critical cooldown speed of the employed material. In this way, an austenitic region can be selectively adjusted which is thereafter held, preferably isothermally, during a predetermined time at a temperature level, so that the structural transformation is specifically adjusted to be bainitic during the holding time. Depending on the employed holding time, a partially bainitic-austenitic structure or an exclusively bainitic structure can be adjusted. If a bainitic-austenitic structure is adjusted, this structure is transformed to a bainitic-martensitic structure in the subsequent press-hardening process.

Within the context of the invention, holding is to be understood as maintaining a substantially identical temperature below the ferrite and perlite temperature, but above a martensite start temperature, i.e. substantially below 700° C., in particular below 600° C., particularly preferred below 550° C. For example, when isothermally holding for a longer time, the temperature may decrease from 500 to 400° C., which however is still considered within the context of the invention to be substantially isothermal. Particularly preferred, the region of the first type is held isothermally during a time interval from 1 second to 80 seconds. Particularly preferred, the holding time is 15 seconds. However, these values are to be selected depending on the employed material alloy.

According to one advantageous feature of the present invention, the intermediate cooling of the region of the first type may be performed in the press-hardening tool, preferably with cooling plates arranged in the press-hardening tool. This reduces the cycle times and also the production costs. In particular, an automobile component having a region of different strength is produced with only two tool steps. Initially, heat-up is performed in a furnace system, followed by a combination of intermediate cooling and hot-forming and press-hardening using only a single tool.

A cooldown speed of at least 25 Kelvin per second may be selected as the cooldown speed in the actual press-hardening process. In one embodiment, the cooldown speed is more than 27 Kelvin per second. However, higher cooldown speeds may be selected for the actual press-hardening process. In particular, the press-hardening process is then performed both in the region of the first type and in the region of the second type at the same cooldown speed depending on the local temperature gradient between press-hardening tool and the workpiece. Due to the different temperatures at the start of the press-hardly process in both regions, the cooldown speed may slightly diverge from the region of the first type to the region of the second type.

In one embodiment, a hardenable steel categorized as micro-alloyed heat-treated steel is used with the method according to the invention. This steel includes in particular the following alloy element in mass weight percent fractions:

| carbon | (C) | 0.19 to 0.25 |
| silicon | (Si) | 0.15 to 0.30 |
| manganese | (Mn) | 1.10 to 1.40 |
| phosphorus | (P) | 0 to 0.025 |
| sulfur | (S) | 0 to 0.015 |
| chromium | (Cr) | 0 to 0.35 |
| molybdenum | (Mo) | 0 to 0.35 |
| titanium | (Ti) | 0.020 to 0.050 |
| boron | (B) | 0.002 to 0.005 |
| aluminum | (Al) | 0.02 to 0.06. |

According to one advantageous feature of the present invention, the intermediate cooling of the regions of the first type may be performed with a tool having integrated cooling plates. The cooling plates have here an intrinsic temperature of up to 600° C., which is still less below the AC3 temperature of more than 900° C. The region of the first type may be cooled down with these cooling plates and then, if desired, held isothermally for a certain time. For example, such cooling plates can be brought to the respective required temperature with electrical heater cartridges or by backside burner heating or with thermal oils.

According to one advantageous feature of the present invention, the intermediate cooling may also be performed with substantially cold cooling plates. The cooling plates may then have a temperature significantly below 400° C., preferably between −100° C. and +100° C., particularly preferred between −10° C. and +25° C. However, an isothermal holding time can only be attained with cold cooling plates a limited way. In one embodiment, both versions of cooling plates may be integrated, for example, in a hot-forming tool and pressing tool, so that the entire process following the actual furnace heating is performed in only a single tool. Within the context of the invention, the cooling plates for performing the intermediate cooling may also be housed in a separate tool, so that the process takes place from a heat-up furnace via intermediate cooling to the actual hot-forming in press-hardening tool. This embodiment has the advantage that the separate tool can be designed substantially as a flat tool with substantially flat heating and/or cooling plates.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
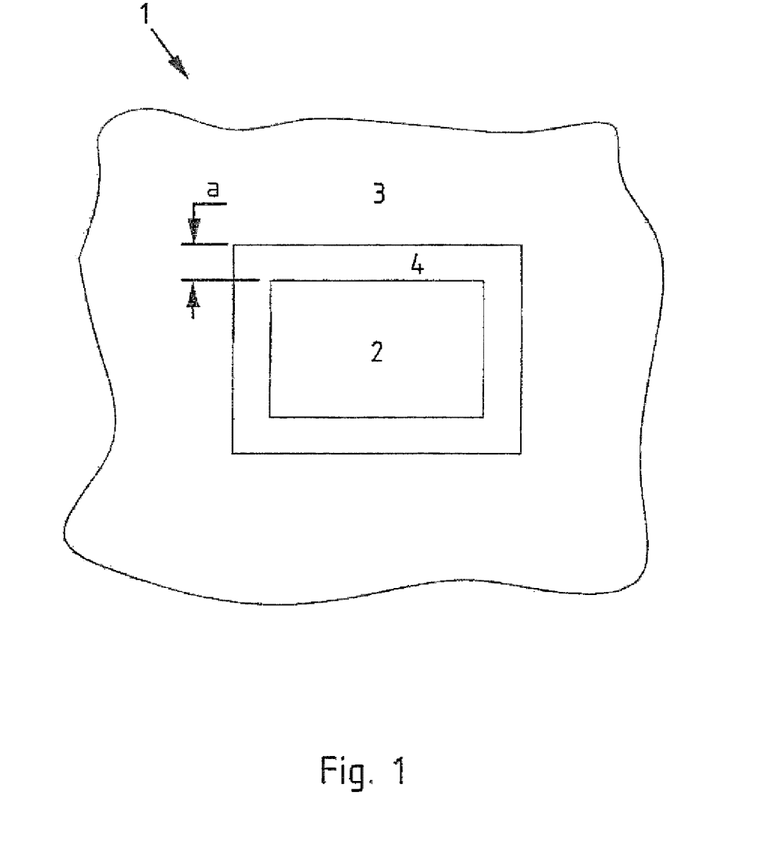
FIG. 1 shows a detail area of an automobile column according to the invention with a region of a first type, a transition region and a region of a second type.

Turning now to the drawing, and in particular to FIG. 1, there is shown a detail of an automobile column 1. As can be seen, a region of the second type 3 according to the invention is formed in a region of the first type 2. A transition region 4 is arranged between the region of the first type 2 and the region of the second type 3. A material structure having a tendency to be ductile is produced in the region of the first type 2, whereas a hard material structure is produced in the region of the second type 3. Within the context of the present invention, the transition region 4 has essentially a width which is quite small compared to the region of the first type 2.

Figure 2:
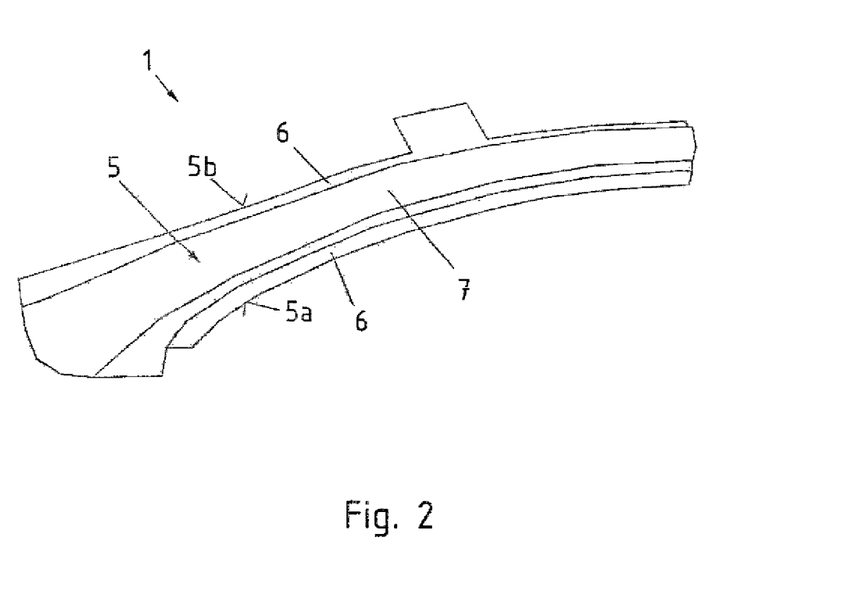
FIG. 2 shows an automobile column according to the invention.

FIG. 2 shows an automobile column 1 in form of an A-column 5 of an automobile body which is not shown in detail. The A-column 5 has joining flanges 6 at its respective sides 5a, 5b, which have a higher ductility than a center profile section 7. The A-column 5 has therefore, due to its center profile section 7, high strength and hardness which guarantees the protection of the passenger compartment in a crash, whereas the joining flanges 6 produce a rather ductile material property compared to the center profile section, so that components (not shown in detail) attached to the joining flanges 6 remain connected with the A-column 5, and the connections, indicated by the joining flanges 6, do not tear off.

Figure 3:
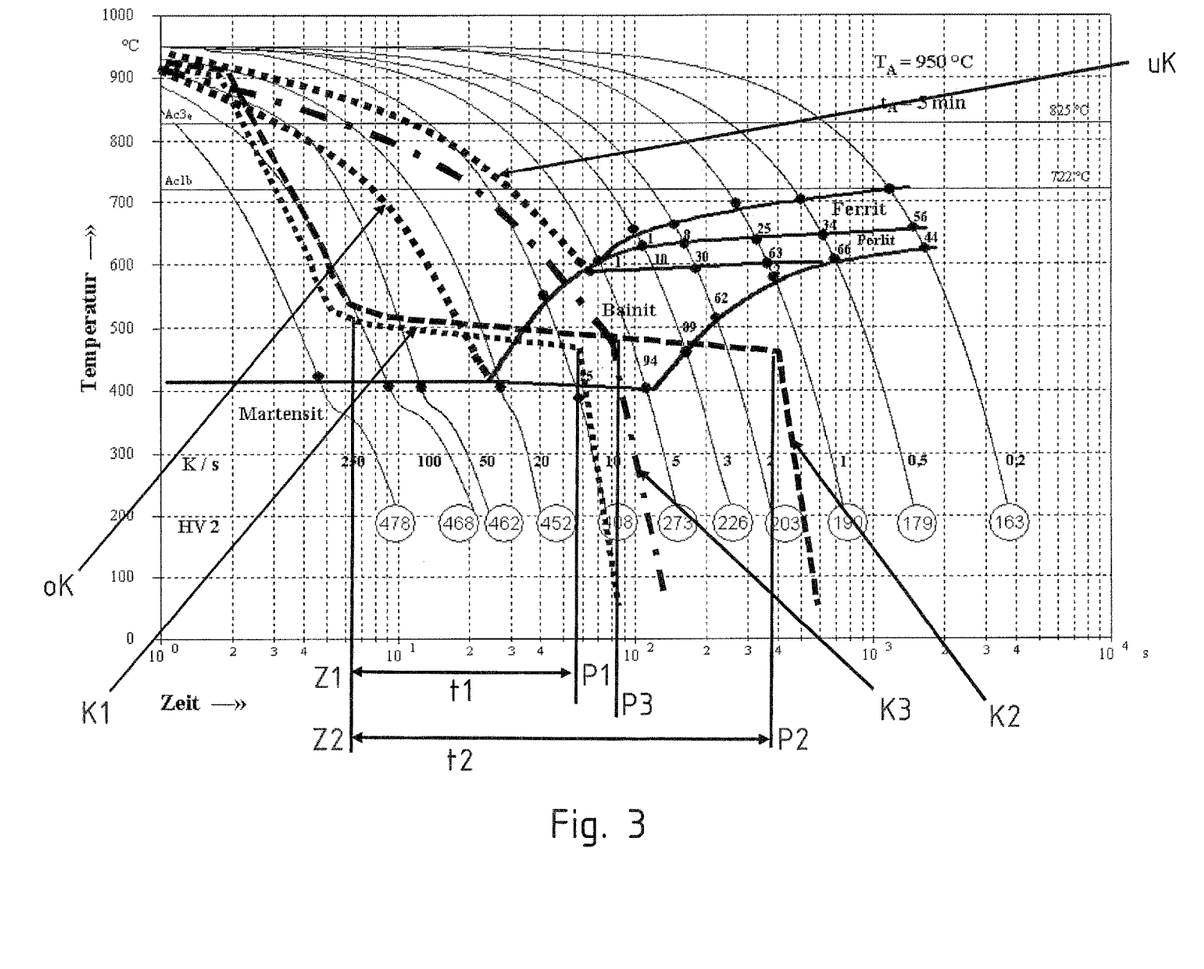
FIG. 3 shows a time-temperature diagram for carrying out a process according to the invention.

FIG. 3 shows a time-temperature diagram of an exemplary steel, without limiting the field of the present invention. Several structures are indicated which are formed in the material at various cooldown speeds as a function of temperature. The lower part of the FIG. shows the martensite formation. Above, in the center region of the FIG., the bainite formation is shown, and there above the perlite and/or ferrite formation.

In the illustrated exemplary embodiment, three different curves for the different cooldown processes are shown. Curve K1 shows the course of the temperature for a first region according to the invention, wherein this region is first heated to a temperature above the AC3 temperature. From this temperature, the material is cooled down to an intermediate temperature of about 520° C. with a cooldown speed which in this case is greater than the upper critical cooldown speed oK for the bainite formation of the illustrated material. When the cooldown temperature of the intermediate cooling of about 520° C. is reached, the first region is held substantially isothermally at a temperature for the time t1. The temperature thereby decreases from about 520° C. to about 480° C. due to heat loss in form of, for example, heat radiation, convection or heat conduction. An austenitic structure is produced at the time Z1 of the intermediate cooling, and a bainitic-austenitic mixed structure is produced at the time P1, corresponding to the start of press-hardening in the first embodiment.

In the first embodiment, quenching thereafter occurs in the press-hardening process from the time P1, such that the bainitic-austenitic mixed structure in the first region is transformed to a bainitic-martensitic mixed structure. In parallel, the second region according to the invention is quenched from a temperature above AC3 by press-hardening, producing a martensitic structure directly from an austenitic structure; however, this is not illustrated in detail for sake of clarity.

The second embodiment of the method according to the invention is illustrated with the cooldown sequence according to curve 2 of the first region. The cooldown sequence of the curve 2 is similar to the cooldown sequence of the curve K1, wherein the cooldown temperature is held for a longer time from a time Z2 (equal to Z1), so that the press-hardening process starts at a time P2. The time interval t2 is therefore greater than t1. The structure in the first region is completely transformed to bainite at the time P2 and therefore does not undergo any further structural transformation after the time P2 due to the cooldown speed.

In a third embodiment according to the present invention, a cooldown speed from a temperature above the AC3 temperature according to curve 3 is selected, so that a transformation occurs directly into the bainitic intermediate structure during the cooldown process of the intermediate cooling. In the first region, an austenitic-bainitic intermediate structure was adjusted, so that when the press-hardening process starts at the time P3, this bainitic-austenitic mixed structure in the first region is transformed to a bainitic-martensitic mixed structure. In the embodiments according to curves 2 and 3, the second region which was held above the AC3 temperature during the intermediate cooling, is in both cases transformed from the austenitic region directly to martensite by the cooldown during the press-hardening process. In the embodiment according to curve 3, the temperature is selected according to the invention to be always greater than the lower critical cooldown speeds uK of the corresponding employed material.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing a hot-formed and press-hardened automobile column having at least two regions of different hardness, said method comprising the steps of:
   providing a hardenable metal plate or semi-finished product and heating the hardenable metal plate or semi-finished product to at least an austenizing temperature,
   intermediately cooling a first region of the metal plate or semi-finished product with a cooldown speed selected to be greater than a lower critical cooldown speed of a material of the metal plate or semi-finished product, and
   hot-forming and press-hardening the metal plate or semi-finished product in a press-hardening tool to form the automobile column
   wherein the first region has a stretchability A50 between 10% and 30%,
   wherein a yield strength or a tensile strength decreases or increases in a transition region between the first region and the second region with a gradient of more than 200 N/mm$^2$ per 10 mm, and
   wherein the first region contains a mixed structure of martensite, bainite and at least one of ferrite and perlite and wherein a bainite content of the first region is more than 50%.

2. The method of claim 1, wherein a second region is held above the austenizing temperature until the second region is transported into the press-hardening tool.

3. The method of claim 1, wherein the cooldown speed during intermediate cooling of the first region is selected such that a bainitic structure is obtained.

4. The method of claim 3, wherein the first region is cooled to a cooling temperature between 600 and 400° C.

5. The method of claim 4, wherein the first region is cooled to a cooling temperature of about 500° C.

6. The method of claim 3, wherein the first region is held at the cooling temperature for a predetermined time.

7. The method of claim 3, wherein the first region is held at the cooling temperature isothermally.

8. The method of claim 1, wherein the mixed structure of the first region is obtained by quenching the first region in the press-hardening tool from a bainitic structure transformation stage.

9. The method of claim 1, further comprising the step of holding the first region isothermally so as to form a substantially pure bainitic structure by press-hardening.

10. The method of claim 1, wherein the cooldown speed of the intermediate cooling is selected to be greater than an upper critical cooling-down speed.

11. The method of claim 1, wherein the intermediate cooling of the region of first region is performed in the press-hardening tool.

12. The method of claim 11, wherein the intermediate cooling of first region is performed by using cooling plates arranged in the press-hardening tool.

13. The method of claim 1, wherein the metal plate is pre-formed into a semi-finished product while cold before being heated to at least the austenizing temperature.

14. The method of claim 1, wherein the first region has a tensile strength between 500 and 1000 $N/mm^2$.

15. The method of claim 2, wherein a transition region between the first region and the second region smaller than 80 mm.

16. The method of claim 2, wherein at least portions of the first region are enclosed by the region of the second type.

17. The method of claim 2, wherein the first region is completely enclosed by the region of the second type.

18. The method of claim 1, wherein the first region is spot-shaped with a diameter of less than 40 mm.

19. The method of claim 1, further comprising constructing the first region as a flange, a connecting flange or an outside edge of the automobile column, or a combination thereof.

20. The method of claim 1, wherein the first region is formed in regions of the automobile column which are subject to strong deformations in a crash or which are configured to dissipate crash energy through deformations.

21. The method of claim 2, wherein the first region has an increased wall thickness in relation to the second region.

22. The method of claim 1, further comprising forming a passage or an edge, or both, in the first region after the hot-forming.

23. The method of claim 1, wherein a yield strength or a tensile strength decreases or increases in a transition region between the first region and the second region with a gradient of more than 400 $N/mm^2$ per 10 mm.

24. The method of claim 2, wherein the second region has a strength of more than 1000 $N/mm^2$.

25. The method of claim 2, wherein the second region has a strength of more than 1200 $N/mm^2$.

26. The method of claim 2, wherein the second region has a strength of more than 1400 $N/mm^2$.

27. The method of claim 1, wherein first region has a yield strength between 200 and 800 $N/mm^2$.

28. The method of claim 1, further comprising manufacturing the automobile column from a Tailor Welded Blank or a Tailor Rolled Blank.

\* \* \* \* \*